July 21, 1925.　　　　　　　　　　　　　　　1,546,632
D. DOW ET AL
METHOD OF AND APPARATUS FOR SEPARATING MIXED GASES
Filed Sept. 11, 1922　　　2 Sheets—Sheet 1

Inventors
Douglas Dow
Elijah P. Lovejoy
Theodore J. Case

July 21, 1925.

D. DOW ET AL 1,546,632

METHOD OF AND APPARATUS FOR SEPARATING MIXED GASES

Filed Sept. 11, 1922   2 Sheets-Sheet 2

Inventors
Douglas Dow
Elijah P. Lovejoy
Theodore J. Case

By Whittemore, Hulbert, Whittemore, & Belknap
Attorneys

Patented July 21, 1925.

1,546,632

UNITED STATES PATENT OFFICE.

DOUGLAS DOW, OF ANN ARBOR, MICHIGAN, AND ELIJAH P. LOVEJOY, OF PRINCETON, ILLINOIS, AND THEODORE J. CASE, OF ANN ARBOR, MICHIGAN.

METHOD OF AND APPARATUS FOR SEPARATING MIXED GASES.

Application filed September 11, 1922. Serial No. 587,577.

*To all whom it may concern:*

Be it known that we, DOUGLAS DOW, ELIJAH P. LOVEJOY, and THEODORE J. CASE, citizens of the United States of America, residing at Ann Arbor, Princeton, and Ann Arbor, respectively, in the counties of Washtenaw, Bureau, and Washtenaw, respectively, and States of Michigan, Illinois, and Michigan, respectively, have invented certain new and useful Improvements in Methods of and Apparatus for Separating Mixed Gases, of which the following is a specification, reference being had therein to the accompanying drawings.

This invention relates to a method and apparatus for separating mixed gases and more particularly to a method and apparatus for separating commercial oxygen and nitrogen from air.

It is the object of the invention to utilize the differential magnetic properties of the constituents of mixed gases and more particularly those composing air to effect a partial separation of the same.

In attaining this object, the invention takes advantage of the following facts: A magnetic particle placed in a uniform magnetic field will be subject to equal forces on all sides and will have no tendency to move. If placed in a non-uniform or differential field such a particle will tend to move to the point of greatest field density. Similarly a dia-magnetic particle will tend to seek the area of lowest field density. Hence, if a mixture including two gases, one magnetic and one diamagnetic, or less magnetic, or having a lower magnetic susceptibility is placed in or passed through a differential magnetic field, varying continuously from an area of very low density to an area of relatively high density, the particles of the two gases will tend to separate. The forces resisting separation are of two kinds, namely, those arising from eddies or from other motion of the gases, and those due to the tendency of the gases to diffuse. The forces arising from motion can be largely eliminated by passing the gaseous mixture through a smooth walled passage in a field of continuously varying density, the direction of flow being at right angles to the direction of field variation. The second class of forces can be reduced by increasing the pressure and decreasing the temperature, inasmuch as the tendency to diffuse varies inversely as the pressure and directly as the absolute temperature. This can be accomplished by the apparatus hereinafter described.

In the drawings:—

Figure 1:
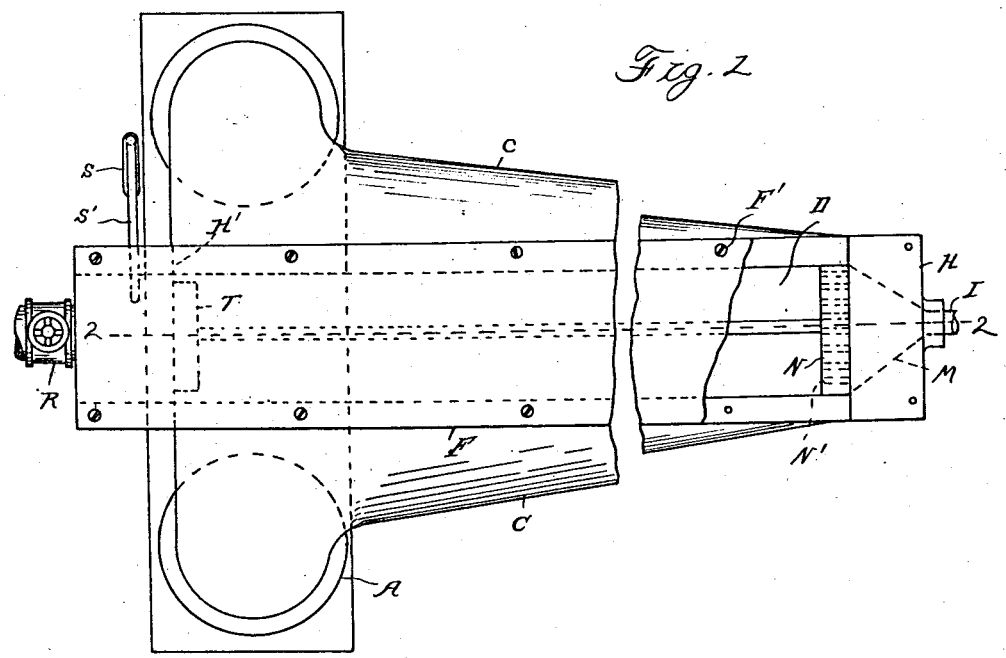
Figure 1 is a top view of an apparatus that may be employed in practicing the disclosed method.
Figure 2:
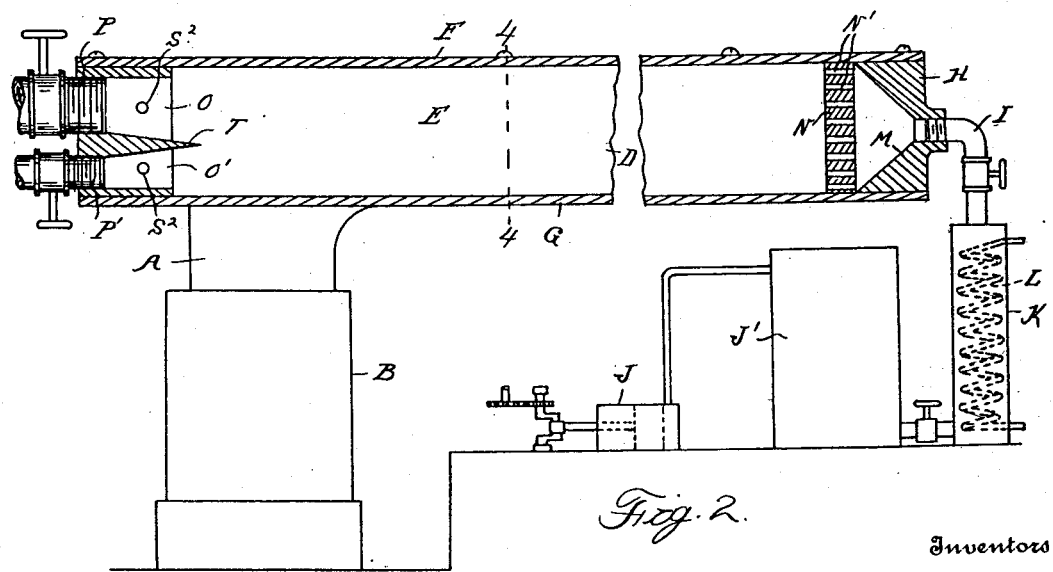
Figure 2 is a longitudinal sectional elevation thereof on line 2—2 of Figure 1.
Figure 3:
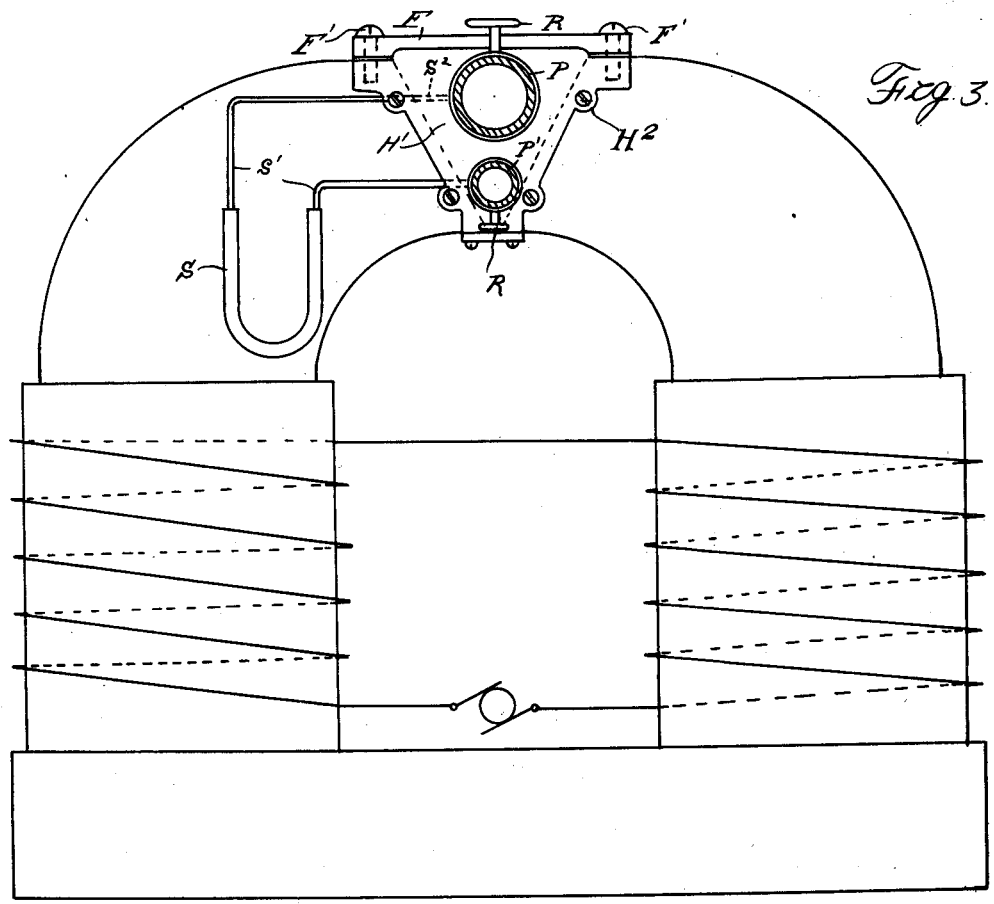
Figure 3 is an end view of the apparatus.
Figure 4:
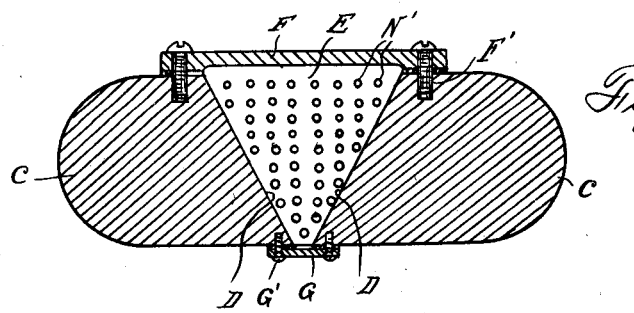
Figure 4 is a cross section on line 4—4 of Figure 2.

In these views the reference character A designates a bi-polar U-shaped electro-magnet, the coils of which are indicated at B and the pole pieces at C. The latter are preferably considerably extended to one side of the coils B and the remote surface thereof are rounding to avoid the concentration of field force resulting from angles. The opposed or pole faces D of the pole pieces C are preferably relatively inclined to produce a substantially trough-shaped opening E between said pole pieces, as best shown in Figure 4. Thus said pole pieces are only slightly spaced at their lower edges and the spaced relation is uniformly increased from bottom to top of the pole faces. The inter-polar opening E forms a passage, (as will presently appear) closed at its top by a plate F marginally seating upon the pole pieces and secured thereto by tap screws F' or other suitable fastenings. Said plate preferably has its bottom face formed (as best seen in Figure 4) with a shallow longitudinal channel registering with the passage E and providing for a slight upward spreading of the magnetic lines of force. The bottom or restricted portion of the passage E is closed by an elongated narrow plate G, which marginally seats upon the bottom faces of the pole pieces and is secured to the latter, as indicated at G'. Closures for the inlet and outlet ends of the passage E are respectively formed by metal blocks H and H'. Compressed air is delivered into the passage E through the block H from a pipe I. J is a compressor for the air thus delivered, J' a storage tank for such air and K a cooling tank through which the air is conducted from the tank J' to the pipe I. Any suitable refrigerating medium may be circulated through a coil L within the tank K to cool the air. To minimize turbulent movement of the air as it enters the passage E it is preferred to form the block H with an air inlet M, uniformly flaring from the diameter of the pipe I to the cross-sectional area of said passage. Also, as a further safe-guard against turbulence, it is desirable to provide a plate N in the passage E, adjacent the inlet thereof, said plate having numerous parallel passages N' extending lengthwise of the passage E and tending to give the air the desired direction. The block H' is formed with upper and lower outlet passages O and O' and pipes P and P' are in communication with said pipes respectively to carry off nitrogenated currents of air. Valves R in said pipes provide for regulation of the air pressure within the passage E and also provide for equalization of the pressures under which the gases discharge through the pipes P and P'. In conjunction with said valve there is employed a manometer S, the tubes S' of which respectively communicate with the bores $S^2$ formed in the block H' and opening into the passages O and O'. Between the passages O and O', the block H' is formed with a knife-edged extension T into the passage E, said extension functioning as a baffle to sharply divide the nitrogenated and oxygenated gases at a predetermined height. The blocks H and H' are secured to the ends of the pole pieces by tap screws $H^2$ or other fastenings, and the plates F and G are extended sufficiently beyond the pole pieces to engage above and below said blocks. To prevent leakage of air (or gases) from the passage E gaskets (not shown) may be used wherever advisable.

In the use of the described apparatus for separating the primary ingredients of air, the air is first placed by the compressor J under such compression as may be employed to best advantage to overcome or reduce the resistance offered to separation of the gases by their tendency to diffuse. With the same object in view, the air is then subjected to the cooling effect of the coil L. It will be most economical to carry the cooling only far enough to relieve the air of the heat units acquired through its compression. The cooled compressed air is now admitted to the passage E, flowing from end to end thereof through the uniformly varying magnetic field existing within said passage. The rate of flow is preferably quite gradual, being modulated by the valves R, so that the momentum of the air or its constituents will not appreciably oppose the magnetic forces, acting transversely to the direction of flow. In passing through said magnetic field the oxygen content of the air, owing to its relatively large magnetic susceptibility, tends to seek the area of greatest density of said field, this area being of course between the relatively close adjacent lower portions of the pole faces. Thus the oxygen content of the air is deflected, during the flow through the passage E, into the lower portion of said passage, displacing the nitrogen content from said portion, and when the mixed gases reach the baffle member T the portion of said gases passing below the baffle will be increased in oxygen content and that above the baffle in nitrogen. The gases, thus enriched, will be conducted by the pipes P and P' to suitable storage receptacles or points of use, not shown. The oxygenated air will find an extensive use for the purpose of supporting combustion in furnaces, it being well known that even a slight increase of the oxygen content of air contributes considerably to efficient combustion.

It is desirable that the pole faces D be smooth and uniformly inclined (although not necessarily plane) in order to avoid any minor points of field concentration that might interfere with the tendency of the oxygen to seek the major area of field concentration between the adjacent lower portions of the pole faces.

A diamagnetic metal such as, for example, zinc is preferably employed for the plates F and G and the blocks H and H', so as to more fully confine the magnetic field.

While the separation of oxygen from air has been considered in the preceding disclosure of the invention, it will be readily understood that the method is equally applicable for separating from a gaseous mixture any ingredient thereof that is relatively high in magnetic susceptibility.

It will be noted that the direction of flow of the gaseous mixture is transverse to the direction of the magnetic lines of force and also that the magnetic field varies in intensity transverse to the direction of flow and to the lines of force. This results in a condition where the molecules of mixed gases under treatment are practically free to respond to the magnetic influence without disturbance due to the direction of flow. This elimination of resistances to a free response of the gases to magnetic force is quite important, since the magnetic attraction is very slight and can be easily overcome by a mechanical disturbance.

The degrees of cooling and pressure are variables depending on the amount of separation desired and the intensity of the field. With a very intense field neither would be needed. It is to be noted that compression of the air, in addition to reducing the tendency to diffuse, also accomplishes an increase of the quantity of air adapted to be acted upon at one time by a given apparatus.

The treatment as above described will not, ordinarily, effect a complete separation of the constituent elements of mixed gases, but will increase the percentage of the respective gases in the separated portions. It is obvious that the degree of separation may be increased by passing the gases through a series of separators or by recirculating through the same separator.

What we claim as our invention is:

1. An apparatus for separating mixed gases comprising an electro-magnet having poles with nonparallel adjacent faces to form therebetween a magnetic field or varying intensity, a closure for the space between said poles, forming an unobstructed passageway and means for passing mixed gases through said enclosed passageway and for separately removing the gases from the more intense and less intense portions of the field.

2. An apparatus for separating mixed gases comprising an electro-magnet having pole pieces with angling faces forming a wedge-shaped space therebetween constituting a magnetic field of varying intensity, means completing the enclosure of said space, means for passing mixed gases through said space longitudinally thereof and transverse to the direction of the magnetic lines of force, and means for separately removing the gases from the more intense and less intense portions of the field.

3. An apparatus for separating mixed gases comprising an electro-magnet, having poles with non-parallel adjacent faces to form therebetween a magnetic field of varying intensity, a closure for the space between said poles, means for passing mixed gases through the inclosed space and for separately removing the gases from the more intense and less intense portions of the field, and means adjacent the inlet of said inclosed space for counteracting turbulence.

4. An apparatus for separating mixed gases comprising an electro-magnet having poles with non-parallel adjacent faces to form therebetween a magnetic field of varying intensity, a closure for the space between said poles, means for passing mixed gases through the inclosed space and for separately removing the gases from the more intense and less intense portions of the fields, and means within said inclosed space for counteracting turbulence.

5. An apparatus for separating mixed gases, comprising an electro-magnet, having opposed spaced pole portions elongated transversely to the plane of the magnet coils, members coacting with said pole portions to form a closed passage, and means for propelling a gaseous mixture through said passage.

6. An apparatus for separating mixed gases comprising an electro-magnet having spaced pole faces, and closure members coacting with said pole faces to form a passage for a gaseous mixture, said members being formed of a diamagnetic material.

7. An apparatus for separating mixed gases comprising an electro-magnet having poles with non-parallel adjacent faces to form therebetween a magnetic field of varying intensity, and closure members coacting with said poles to form a passage for a gaseous mixture, said members being formed of a diamagnetic material.

8. An apparatus for separating mixed gases comprising a conduit for the gases, means for producing a differential magnetic field in said conduit having the lines of force transverse to the longitudinal axis thereof and the variation in intensity also transverse to said longitudinal axis, means for introducing the mixed gases at one end of said conduit, and means for separately withdrawing the gases at the opposite end of said conduit from the more intense and less intense portions of the field.

9. An apparatus for separating mixed gases comprising an unobstructed substantially straight conduit for the gases, means for producing a differential magnetic field in said conduit having the lines of force transverse to the longitudinal axis thereof and the variation in intensity also transverse to said longitudinal axis, means for introducing the mixed gases at one end of said conduit, and means for separately withdrawing the gases at the opposite end of said conduit from the more intense and less intense portions of the field.

10. The method of separating mixed gases comprising the flowing of a mixture through a differential magnetic field transverse to the direction of the lines of force and also transverse to the varying intensity of the field and in removing different portions of the gases from the portions of said field differing in magnetic intensity.

11. The method of separating mixed gases comprising the flowing of a mixture through a differential magnetic field transverse to the direction of the lines of force and also transverse to the varying intensity of the field and in separately removing concentrated portions of the gaseous mixture from portions of said field differing in magnetic intensity.

12. The method of separating mixed gases which consists in slowly flowing a compressed mixture of mixed gases through a differential magnetic field transverse to the direction of the lines of force and also transverse to the varying intensity of the field, maintaining said gases under pressure during the flow and separately removing portions of the gases from portions of the field of different magnetic intensities.

13. The method of separating mixed gases which consists in slowly flowing a compressed mixture of gases through a substantially straight conduit in a differential magnetic field, the direction of flow being transverse to the direction of the lines of force and also transverse to the varying intensity of the field, maintaining said gases under a substantial pressure during the flow and separately removing portions of the gases from the more intense and less intense portion of the field.

14. The method of separating mixed gases involving the flowing of the mixture through a substantially straight passageway in a differential magnetic field formed between relatively inclined pole faces in a direction substantially parallel to said faces and transverse to the magnetic lines of force.

15. The method of separating mixed gases comprising the flowing of the mixture through a differential magnetic field formed between relatively inclined pole faces in a straight direction substantially parallel to said faces and continually removing portions of said mixture from the concentrated portion of said magnetic field produced where the pole faces approach each other.

16. The method of separating mixed gases comprising the compressing of a gaseous mixture, the flowing of said mixture at a slow rate through a substantially straight conduit in a differential magnetic field, the direction of flow being transverse to the direction of the lines of force and also transverse to the varying intensity of the field, and in separately removing portions of the mixture from more intense and less intense portions of the magnetic field.

In testimony whereof we affix our signatures.

DOUGLAS DOW.
ELIJAH P. LOVEJOY.
THEO. J. CASE.